United States Patent
Gerding et al.

(10) Patent No.: US 7,479,749 B2
(45) Date of Patent: Jan. 20, 2009

(54) VEHICLE SEAT ARRANGEMENT WITH AN ELECTRIC ADJUSTMENT MECHANISM

(75) Inventors: Rainer Gerding, Hannover (DE); Thomas Bethge, Wennigsen (DE)

(73) Assignee: Faurecia Autositze GmbH, Stadthagen (DE)

(*) Notice: Subject to any disclaimer, the term of this patent is extended or adjusted under 35 U.S.C. 154(b) by 0 days.

(21) Appl. No.: 11/543,897

(22) Filed: Oct. 6, 2006

(65) Prior Publication Data

US 2007/0080657 A1  Apr. 12, 2007

(30) Foreign Application Priority Data

Oct. 8, 2005  (DE) .................. 10 2005 048 279

(51) Int. Cl.
B60N 2/02 (2006.01)
B60R 21/013 (2006.01)
(52) U.S. Cl. ............... 318/469; 318/286; 318/468
(58) Field of Classification Search ............. 318/283, 318/286, 466–470
See application file for complete search history.

(56) References Cited

U.S. PATENT DOCUMENTS

| | | | | |
|---|---|---|---|---|
| 3,930,555 A * | 1/1976 | Iijima | ............... | 180/269 |
| 4,204,255 A * | 5/1980 | Cremer | ............... | 701/49 |
| 4,434,468 A * | 2/1984 | Caddick et al. | ......... | 701/49 |
| 5,785,347 A * | 7/1998 | Adolph et al. | ......... | 280/735 |
| 6,270,114 B2 * | 8/2001 | Mai et al. | ......... | 280/735 |
| 6,385,517 B1 * | 5/2002 | Kore | ............... | 701/45 |
| 6,915,196 B2 * | 7/2005 | Rao et al. | ......... | 701/45 |
| 7,236,865 B2 * | 6/2007 | Prakah-Asante et al. | ...... | 701/45 |
| 2006/0001298 A1 * | 1/2006 | Tsurula et al. | ......... | 297/216.16 |
| 2006/0249324 A1 * | 11/2006 | Weber et al. | ......... | 180/268 |
| 2007/0257528 A1 * | 11/2007 | Akaike et al. | ......... | 297/216.12 |

FOREIGN PATENT DOCUMENTS

| | | |
|---|---|---|
| DE | 43 02 042 A1 | 7/1994 |
| DE | 197 49 838 A1 | 6/1999 |
| DE | 199 61 799 A1 | 7/2001 |
| DE | 10 2004 020 049 A1 | 11/2005 |
| WO | 01/45979 A1 | 6/2001 |

* cited by examiner

*Primary Examiner*—Bentsu Ro
(74) *Attorney, Agent, or Firm*—Shlesinger, Arkwright & Garvey LLP

(57) ABSTRACT

Vehicle seat arrangement includes an electric adjustment mechanism, a direct current motor for adjusting a vehicle seat component, with direct current terminals configured to receive a motor current. a control device for controlling or regulating direct current motor, which applies direct current to the direct current terminals based upon adjustment speed to be set. upon receiving a comfort adjustment signal control device actuates direct current motor for a gradual comfort adjustment of vehicle seat component, upon receiving a pre-crash signal control device actuates direct current motor for a rapid pre-crash adjustment of vehicle component from a current initial position to a safe pre-crash position. Adjustment data for safe pre-crash position and initial position are stored in a memory device prior to pre-crash adjustment, and rapid pre-crash adjustment is implemented at a load and acceleration that are the maximum permissible for direct current motor at the respective operating point.

10 Claims, 2 Drawing Sheets

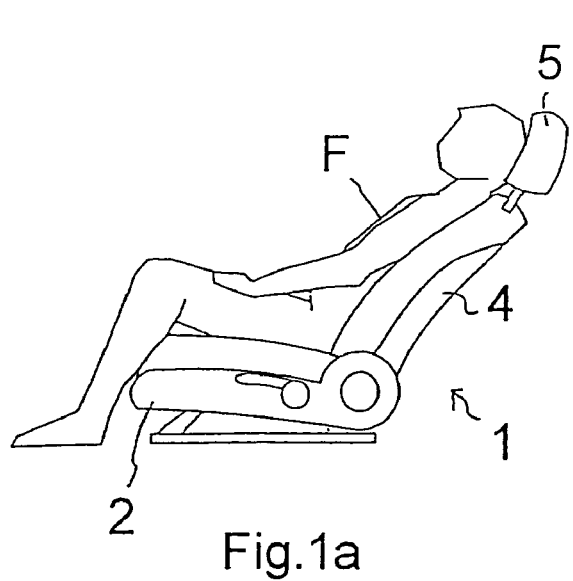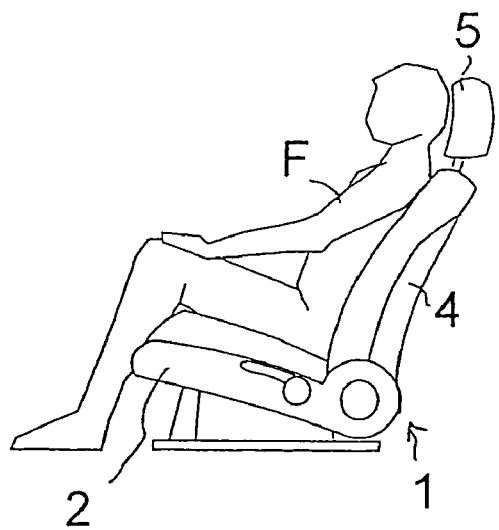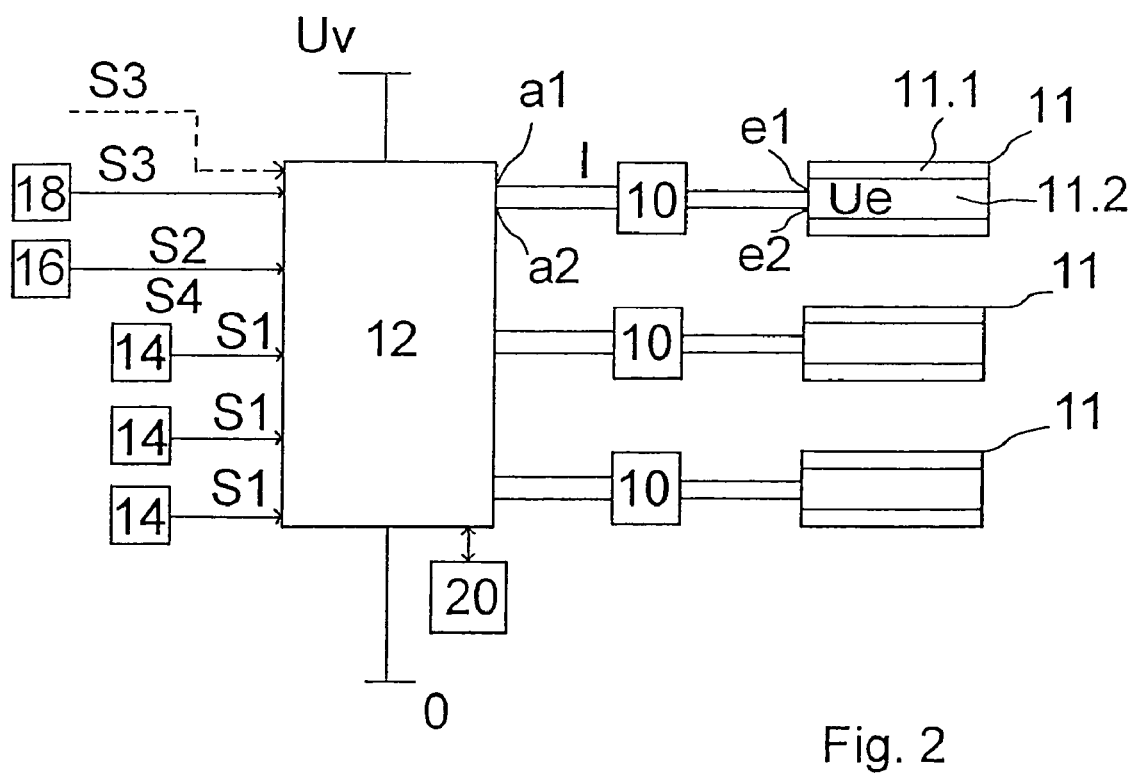

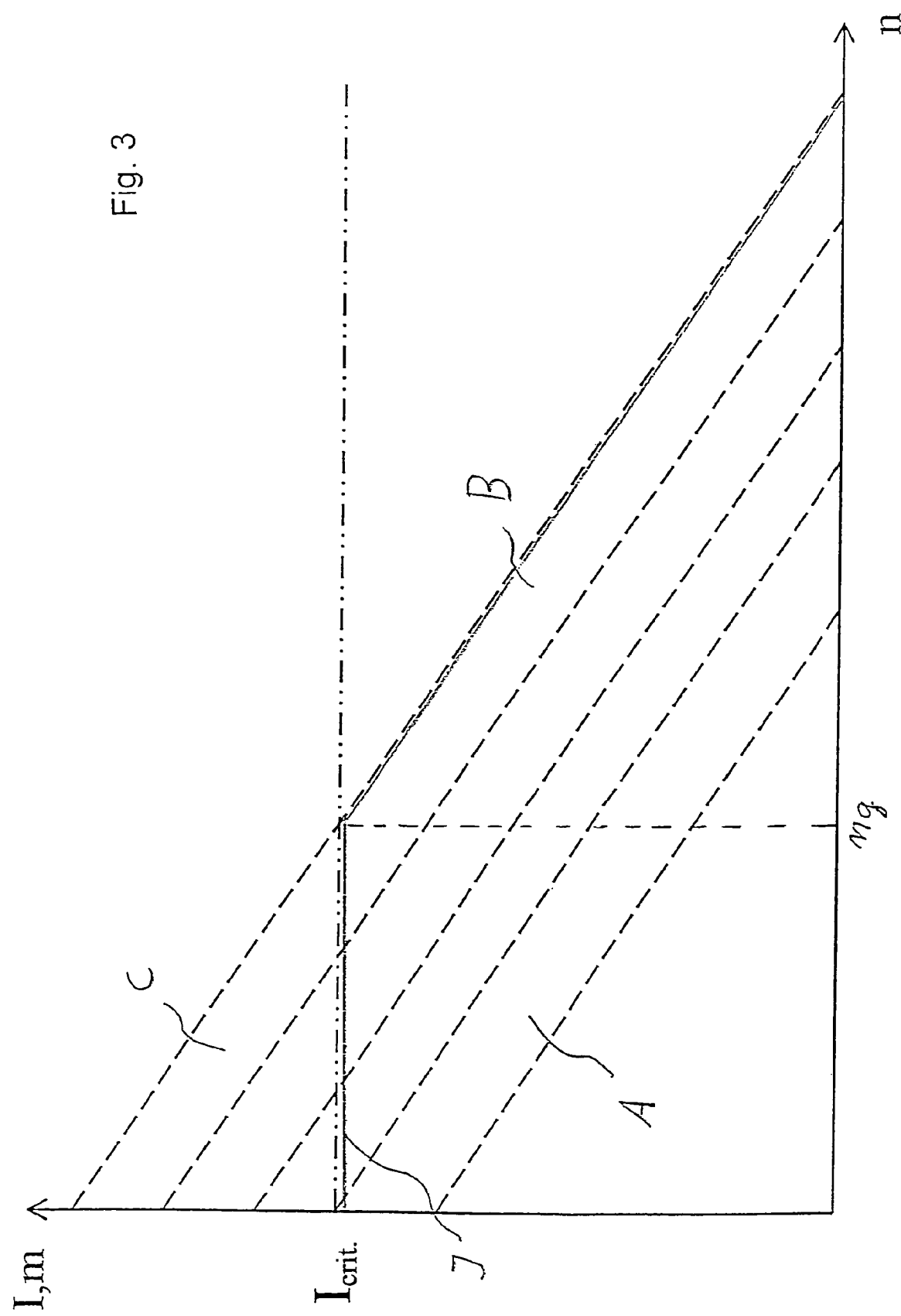

VEHICLE SEAT ARRANGEMENT WITH AN ELECTRIC ADJUSTMENT MECHANISM

CROSS-REFERENCE TO RELATED APPLICATIONS

This application claims priority of German application no. 10 2005 048 279.1, filed Oct. 8, 2005, and which is incorporated herein by reference.

FIELD OF THE INVENTION

The invention relates to a vehicle seat arrangement with at least one electric adjustment mechanism, at least one vehicle seat component including direct current terminals configured for receiving a motor current from a direct current motor provided for the adjustment of the at least one vehicle seat component, and a control device for controlling or regulating the at least one direct current motor.

BACKGROUND OF THE INVENTION

To adjust a vehicle seat or individual components of the vehicle seat, for example the backrest, the seat cushion, the headrest or the entire seat or seat frame, direct current motors are especially used, which are actuated via a control device.

Further, in addition to adjustments for comfort at a low adjustment speed, pre-crash adjustments are also known, in which generally a higher adjustment speed is employed. In this connection, the control device ordinarily receives a rapid adjustment signal from a sensor. Adjustments of this type are known, for example, from WO 01/45979 A1, DE 199 61 799 A1, and DE 197 49 838 A1. In these, sensors in the vehicle, such as distance sensors, detect an imminent crash state, such as a collision with an obstacle located in front of the vehicle, and the control device transmits a control signal to an adjustment device, so that the adjustment device can move a seating component to a crash-safe position before the collision.

With an adjustment of this type, a greater degree of crash safety can be ensured in many situations. Nevertheless, frequently the amount of time available for adjusting the vehicle components once the pre-crash situation has been detected is insufficient, especially if one's own or another's vehicle is traveling at high speed, or if the performance capacity of the adjustment device is too low.

Permanently excited direct current motors, with their light weight and low manufacturing costs, offer high performance capacity even at low currents. Ordinarily they are designed such that the high motor current that is achieved during the start-up of the direct current motor with application of a high voltage will not result in an unacceptable, irreversible demagnetization of the permanent magnet. With permanently excited direct current motors, the maximum amount of power that can be accommodated in a given installation size is limited by the magnets used and by the maximum permissible magnetic field. If the critical value of the magnetic field is exceeded, an irreversible demagnetization of the permanent magnet will result.

The critical operating point is at start-up, as at this point the greatest amount of current, the so-called block current, is flowing. This operating state is particularly critical at low temperatures, when the resistance of the copper winding is at its lowest, and the current, and therefore the magnetic field as well, are at their highest. For each predetermined motor geometry, these boundary conditions result in a maximum realizable performance. Accordingly, the direct current motors are designed such that at the time of start-up, no excessive block currents can occur.

For this reason, the control range of the permanently excited direct current motors in seat adjustment mechanisms is limited. Thus, in order to achieve high adjustment speeds for pre-crash adjustments, direct current motors having larger dimensions, which are designed for higher block currents, generally must be used. Accordingly, high manufacturing costs and large mounting volumes result.

OBJECTS AND SUMMARY OF THE INVENTION

The object of the invention is to create a vehicle seat arrangement, in which a pre-crash adjustment of the vehicle seat or a vehicle seat component can be achieved relatively cost-effectively and at low expense.

This object is achieved with a vehicle seat arrangement including at least one electric adjustment mechanism, and at least one vehicle seat component including direct current terminals configured for receiving a motor current. At least one direct current motor is provided for the adjustment of the at least one vehicle seat component, and a control device for controlling or regulating the at least one direct current motor is provided. the control device applies a direct current to the direct current terminals, in use, based upon the adjustment speed to be set, and the control device actuates the at least one direct current motor device upon receiving a comfort adjustment signal, in use, for providing a gradual comfort adjustment of the at least one vehicle seat component. Further, the control device activates the at least one direct current motor upon receiving a pre-crash signal, in use, for providing a rapid pre-crash adjustment of the at least one vehicle seat component from an initial position to a safe pre-crash position. There is a memory device provided for storing adjustment data for the safe pre-crash position and the initial position, the memory device being configured for storing adjustment data prior to the pre-crash adjustment, in use. Still further, the control device activates the at least one direct current motor upon receiving a pre-crash signal, in use, and implements the rapid pre-crash adjustment at a load and an acceleration that are the maximum permissible load and acceleration for the at least one direct current motor at a respective operating point, in use.

Additional preferred further improvements and embodiments are described herein.

The invention is based upon the concept of implementing an adjustment via the motor, upon recognition of a pre-crash situation, at a higher rate of speed than for a comfort adjustment, by increasing the amount of voltage being supplied to the motor. In this connection, the motor is run in a maximum permissible operating mode, in other words with maximum current or maximum acceleration.

In principle, the application of a higher supply voltage to the direct current motor can result in damage to the motor caused by overheating; however, because according to the invention the higher voltage is applied only in the pre-crash situation, the higher voltage application and therefore the higher performance output of the motor occurs over only a brief timespan, so that as a rule no, or at least only a slight, impairment occurs; ordinarily, the involved components are able to directly absorb the increased quantity of heat.

Thus, according to the invention, without the supplementary use of pyrotechnical devices, and without excessive instrumental expense, a rapid, reversible adjustment of a safety-relevant vehicle component can be achieved.

According to the invention, the pre-crash position to be employed and the initial position are stored, so that if the crash is avoided, a resetting, for example at the comfort speed, is possible.

Advantageously, the direct current motor is configured such that during operation within the input voltages provided by the control device, a range with impermissibly high motor currents above the critical limiting current first occurs. This means that the motor winding is too large for the dimensions of the motor and the configuration of the permanent magnet unit, or it generates magnetic fields that are too high. In an embodiment of this type, however, current-limiting circuitry is provided for the purpose of limiting the motor current.

Advantageously, the motor configuration can be illustrated in a family of characteristic curves, especially in the plotting of the motor current as a function of the speed at which the impermissible range occurs at low speeds, with this range being avoided as a result of the current-limiting circuitry of the invention.

This is based upon the concept of the invention of dimensioning a direct current motor not in the customary manner, as a large-displacement motor, in which even with the occurrence of block current it will not exceed its critical current intensity and the critical magnetic field that is thereby achieved, but instead to implement the configuration of the motor winding such that when the permanent magnet is employed, in principle the winding will permit an impermissible operating status, in which the irreversible demagnetization of the permanent magnet is allowed to occur. Because, according to the invention, the motor current feed is admitted only via the current-limiting circuitry, this potential state or range of its family of characteristic curves that is possible due to its configuration can in turn be prevented.

With this surprising step of an unacceptably configured motor with supplementary current-limiting circuitry, a high-speed adjustment can be achieved at surprisingly little additional expense, with relatively small dimensions, and the given permanent magnet. In one start-up state, the block current is first limited to the critical limiting current or is held below the critical limiting current, so that no demagnetization of the permanent magnet will occur. The accelerating motor then reaches a limiting speed or limiting adjustment speed, beyond or above which, based upon its family of characteristic curves, the consumed motor current, and the motor torque that is thereby achieved, decrease. The current-limiting circuitry thus is no longer active with the subsequent acceleration of the direct current motor. And with the further adjustment at higher adjustment speeds or motor torques there is no limitation to the possible performance capacity. The motor configuration specified in the invention therefore results in no notable slowing down of the high-speed adjustment relative to larger-configuration motors with higher critical limiting current intensities, as in any case lower speeds are achieved during the brief start-up phase.

The current-limiting circuitry can especially be integrated into the control device; it can also be integrated into the direct current motor, or it can be provided as an additional component. According to the invention, the control device can also already be integrated into the direct current motor, or can be a part of the device for controlling the entire seat.

The control device can provide input voltages, for example, up to the operational voltage of the electrical system, for example 12 V. In this connection, the family of characteristic curves relates to the entire voltage range output by the control device; thus in the critical start-up range voltages are applied, for example, up to the operational voltage, and the current that is delivered is limited.

According to the invention, the control of the direct current motor is implemented directly via the motor current or the excitation current of the motor windings, wherein pulse-width modulation (PWM) can be used.

Below, the invention will be described in greater detail using one embodiment, with reference to the attached set of drawings.

Relative terms such as left, right, up, and down are for convenience only and are not intended to be limiting.

BRIEF DESCRIPTION OF THE DRAWINGS

FIG. 1$a$ is a vehicle seat with the user in the comfort position;

FIG. 1$b$ is a vehicle seat with the user in the crash-safe position;

FIG. 2 is a functional block diagram of an adjustment mechanism according to the invention; and FIG. 3 is a family of characteristic curves according to the invention provided for the purpose of illustrating the control configuration according to the invention.

DETAILED DESCRIPTION OF THE INVENTION

A person F is seated in a vehicle seat 1 with a seat cushion 2, a backrest 4 and a headrest 5. FIG. 1$a$ shows a comfort position set by the person. Upon recognition of a pre-crash situation, the vehicle seat 1 is adjusted to the crash-safe position shown in FIG. 1$b$, in which the backrest 4 is moved forward and the seat cushion 2 is moved forward and raised. If necessary, the headrest 5 and/or the entire seat 1 can also be shifted toward the front. The adjustments are implemented via direct current motors 11, each of which is supplied with direct current via a current-limiting device 10 by a common control device 12, according to the block diagram of FIG. 2. The control device 12 can be configured to include a single component or multiple components, and is connected to the vehicle electrical system UV of, for example, 12 V. For each of the, for example, three parallel connected direct current motors 11, the control device 12 has two outlets a1, a2, to which an appropriate polarity is applied, based upon the desired direction of adjustment. The current-limiting circuits 10 limit the amount of direct current output, as will be described in greater detail further below, and transmit it to the input terminals e1, e2 of the respective direct current motor 11. The direction of adjustment of the direct current motor 11 can therefore be adjusted based upon the polarity that is applied by the control device 12. Advantageously, a control of the direct current motors 11 takes place, wherein positioning sensors 14 are provided that are configured to measure the respective positions of the seat 1 or the seat components 2, 4, 5 to be adjusted, and that transmit positioning signals S1 to the control device 12. The control of the direct current motors 11 can be implemented in particular directly via the motor current I or the excitation current of the motor windings, wherein pulse-width modulation (PWM) can be utilized.

The control device 12 receives comfort adjustment signals S2 from an actuation device 16 operated by the user, which is formed by a switch panel with multiple switches or by a plurality of controls, and can be positioned inside or outside of the vehicle seat 1. Based upon the comfort adjustment signals S2 a comfort adjustment of the direct current motors 11 is implemented. In this connection, the current-limiting circuitry 10 is generally not active, as only low current levels I are delivered.

The control device 12 further receives a pre-crash signal S3 from a pre-crash sensor 18, or alternatively from another control device, which has recognized a pre-crash situation from the data or signals available to it. Upon reception of the pre-crash signal S3, the control device 12 initiates a pre-crash adjustment of at least one, several, or all direct current motors 11.

In each case the control device 12 stores the respective positioning data for the seat 1 or for the seat components 2, 4, 5 to be adjusted in a memory device 20, which can also be configured accordingly as a part of the control device 12 or can be integrated into the device. These data can be stored on an ongoing basis, or upon reception of the pre-crash signal. During the pre-crash adjustment, the maximum permissible currents I are delivered, as will be described below in reference to FIG. 3, whereby the maximum possible adjustment speed of the direct current motors 11 is activated. Upon termination of the pre-crash situation, in other words when the signal S3 has been reset, for example, to zero, the control device 12 initiates the resetting of the direct current motors 11 to their previous position, automatically or in response to a corresponding actuating signal S4 input by the user via, for example, a button on the actuation device 16, to which end the control device 12 retrieves the positioning data that are stored in the memory 20.

Each of the direct current motors 11 includes a permanent magnet device 11.1 and at least one motor winding (armature winding) 11.2. According to one preferred embodiment, the direct current motors 11 are configured according to the family of characteristic curves of FIG. 3, in which the motor current I is plotted against the speed n of the direct current motor 11.

According to the invention, in the family of characteristic curves shown in FIG. 3, the motor current I is plotted against the speed n of the direct current motor 11. Because in the direct current motor 11 the generated motor torque m is proportional to the magnetic field and thus is also proportional to the motor current I, FIG. 3 accordingly also illustrates the dependence of the motor torque m on the motor speed n. The achievable amount of torque m drops with increasing speed n, with overall output being calculated as the product of the motor torque m and the speed n. The dashed lines in FIG. 3 thus indicate characteristic curves for a motor at various voltages. According to the invention, a direct current motor 11 with a high level of output is selected, which is characterized by the uppermost dashed line and corresponds to operation at maximum voltage. Operation in the family of characteristic curves that lies below this uppermost dashed line thus accordingly indicates running at the performance capacity of a lower output direct current motor. Because according to the invention especially PWM can be utilized, the plotted values for I can result correspondingly as average values, or as a result of the inductive smoothing of the pulses, respectively.

In this embodiment, the direct current motor 11 is dimensioned such that its family of characteristic curves shown in FIG. 3 contains a range C, in which a full supply of current would result in an unacceptable demagnetization of its permanent magnets 11.1. In FIG. 3 a critical current intensity $I_{crit.}$ is plotted, for purposes of illustration, above which, in other words at $I > I_{crit.}$, the unacceptable demagnetization of the permanent magnets 11.1 would be irreversible, and thus the direct current motor 11 would be destroyed.

According to the invention, the current-limiting circuitry 10 thus limits the motor current I below the value $I_{crit.}$. Thus in the family of characteristic curves shown in FIG. 3, three ranges result: at low motor speeds n (up to a value ng that is irrelevant as such) a range A, which is limited at the top by $I < I_{crit.}$, a range B that relates to higher speeds n, which is limited at the top by the motor characteristic curve, and the instrumentally possible range C, which is excluded by the current-limiting device 10.

In the pre-crash adjustment of the vehicle seat 1 or the seat components 2, 4, 5, upon input of the pre-crash signal S3 with a supply of current to the motor winding 11.2, at first the motor current I is limited according to the plotted line to $I < I_{crit.}$, until the starting up direct current motor 11 reaches the speed ng. The motor current I then drops off along the uppermost dashed characteristic curve. In principle, adjustments can be made in both directions, for example they can also be achieved with a backward adjustment, so that the family of characteristic curves is relevant in principle for both polarities. In the case of a pre-crash adjustment, however, in general only the polarity of the forward adjustment is relevant, as the backward adjustment takes place more slowly.

In the family of characteristic curves shown in FIG. 3, the comfort adjustment is thus generally run at lower dashed characteristic curves than the pre-crash adjustment.

Alternatively to the motor configuration shown in FIG. 3, other direct current motors can also be used in principle.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Vehicle seat arrangement, comprising:
   a) at least one electric adjustment mechanism;
   b) at least one vehicle seat component;
   c) at least one direct current motor provided for the adjustment of the at least one vehicle seat component, the direct current motor including direct current terminals configured for receiving a motor current;
   d) a control device for controlling or regulating the at least one direct current motor, and the control device applies a direct current to the direct current terminals, in use, based upon the adjustment speed to be set;
   e) the control device actuates the at least one direct current motor device upon receiving a comfort adjustment signal, in use, for providing a gradual comfort adjustment of the at least one vehicle seat component;
   f) the control device activates the at least one direct current motor upon receiving a pre-crash signal, in use, for providing a rapid pre-crash adjustment of the at least one vehicle seat component from an initial position to a safe pre-crash position;
   g) a memory device provided for storing adjustment data for the safe pre-crash position and the initial position, the memory device being configured for storing adjustment data prior to the pre-crash adjustment, in use;
   h) the control device activates the at least one direct current motor upon receiving a pre-crash signal, in use, and implements the rapid pre-crash adjustment at a load and an acceleration that are the maximum permissible load and acceleration for the at least one direct current motor at a respective operating point, in use;
   i) the at least one direct current motor including at least one winding which is connected to the direct current terminals, and a permanent magnet unit;
   j) a family of characteristic curves of the at least one direct current motor has at least one range, in which motor currents occur that are greater than a limiting current intensity which is critical for maintaining the magnetization of the permanent magnet unit;

k) current-limiting circuitry provided for the purpose of limiting the motor current that flows through the at least one winding at the critical limiting current intensity or below the critical limiting current intensity;

l) an unacceptable range of the at least one range, in which motor currents occur that are greater than a limiting current intensity, occurs at low motor speeds and at high motor torque; and m) the unacceptable range is relevant during the start-up of the at least one direct current motor in the event of a pre-crash adjustment, in use, and is excluded by the current-limiting circuitry.

2. Vehicle seat arrangement according to claim 1, wherein:
a) the memory device is integrated into the control device or connected to it.

3. Vehicle seat arrangement according to claim 1, wherein:
a) if a collision is avoided, in use, the at least one vehicle seat component is reset to its most recently set initial position automatically or upon receipt of an actuation signal.

4. Vehicle seat arrangement according to claim 1, wherein:
a) during the start-up, the at least one direct current motor is operated at a constant motor current, below the limiting current intensity, until it reaches a limiting speed, above which the motor current runs in the family of characteristic curves below the limiting current intensity.

5. Vehicle seat arrangement according to claim 1, wherein:
a) a motor speed is adjusted via a control with pulse-width modulation (PWM).

6. Vehicle seat arrangement according to claim 1, wherein:
a) one of the at least one direct current motor is provided for the purpose of adjusting at least one of the following:
　i) a longitudinal adjustment of the seat;
　ii) a forward folding or tilting of the backrest;
　iii) a shifting of the seat cushion; and
　iv) a height adjustment of the headrest.

7. Vehicle seat arrangement according to claim 1, wherein:
a) multiple ones of the at least one direct current motor are actuated simultaneously at high adjustment speeds upon receiving the pre-crash signal.

8. Vehicle seat arrangement according to claim 1, wherein:
a) the control device is integrated into the at least one direct current motor.

9. Vehicle seat arrangement according to claim 1, wherein:
a) the control device is integrated into another control device.

10. Vehicle seat arrangement according to claim 9, wherein:
a) the other control device is the central control device of the vehicle seat.

\* \* \* \* \*